United States Patent
Tsai et al.

(10) Patent No.: US 7,697,611 B2
(45) Date of Patent: Apr. 13, 2010

(54) METHOD FOR PROCESSING MOTION INFORMATION

(75) Inventors: Chia-Yang Tsai, Hsinchu (TW); S. Sam Tsai, Hsinchu (TW); Hsueh-Maing Hang, Hsinchu (TW); Ti-Hao Chiang, Hsinchu (TW); Guo-Zua Wu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 1385 days.

(21) Appl. No.: 11/023,491

(22) Filed: Dec. 29, 2004

(65) Prior Publication Data

US 2006/0023790 A1    Feb. 2, 2006

(30) Foreign Application Priority Data

Jul. 30, 2004    (TW) .............................. 93122853 A

(51) Int. Cl.
   *H04N 7/12*    (2006.01)
(52) U.S. Cl. ............. 375/240.16; 375/240; 375/240.01; 375/240.12
(58) Field of Classification Search ................. 375/240, 375/240.01, 240.12, 240.16; 348/699
   See application file for complete search history.

(56) References Cited

U.S. PATENT DOCUMENTS 5,471,252 A * 11/1995 Iu .............................. 348/699
5,510,856 A *  4/1996 Jung ........................... 348/699

FOREIGN PATENT DOCUMENTS

| JP | 6-153167 A   | 5/1994 |
| JP | 8-9340 A     | 1/1996 |
| JP | 8-214318 A   | 8/1996 |
| JP | 2000-270329 A | 9/2000 |
| JP | 2004-180044 A | 6/2004 |

* cited by examiner

*Primary Examiner*—Allen Wong
(74) *Attorney, Agent, or Firm*—Birch, Stewart, Kolasch & Birch, LLP

(57) ABSTRACT

A method for processing video image is provided to perform a motion vector filtering process on the image after being processed by a motion estimation process. The motion vector filtering process adjusts the motion vectors derived for each block in a video sequence, so that the motion vector of each block and the actual moving direction of the corresponding object in the image tend to conformity. Then, the blocks with similar motion vectors are merged and blocks with radical motion vectors are corrected, thereby reducing distortion of the output image and the number of bits used to represent the motion information, which in turns increases the efficiency of compression process.

4 Claims, 3 Drawing Sheets

METHOD FOR PROCESSING MOTION INFORMATION

FIELD OF THE INVENTION

The present invention relates to a method for processing motion information, and more particularly, to a method for processing motion information that allows the motion vectors of each block of the continuous image and the actual moving directions of the corresponding objects to tend to conformity, thereby reducing the number of bits required for representing moving information.

DESCRIPTION OF THE PRIOR ART

In today's world with exploding amount of information, the amount of data processed is large, especially in the field of video processing. In order to store these data and transmit them over the Internet in an efficient way, it is necessary to compress the data efficiently to meet the needs of the users.

The commonly seen video compression standards are MPEG and ITU H series specifications defined by MPEG committee and ITU-T, respectively. These conventional video compression schemes basically have temporal DPCM structure with spatial transform coding. These video compression standards are widely used in many applications nowadays, such as VCD, DVD, HDTV, VoD (Video on Demand) etc. Normally the video compression is carried out in a lossy way, and the quality thereof varies. For most applications such as entertainments, human eyes determine the ultimate quality of an image or video.

In the wavelet video compression for continuous images, the concept of wavelet transformation is utilized. The adjacent images are decomposed into high-pass frames and low-pass frames in the time domain using a technique called a Motion Compensated Temporal Filtering (MCTF). After that, the low-pass frames are further decomposed temporally. This operation is repeated until the desired decomposition depth is reached. The motion compensation technique is a critical step in MCTF, in which the correlations between consecutive frames are removed to achieve compression. Consecutive frames are composed at least of a first frame and a second frame in the case of two-tap temporal filter being in use. More frames may be used for filters with more taps. When MCTF with two-tap filter is performed, the new low-pass and high-pass frames are derived from the sum and the difference of the first and the second frames along the motion trajectories. To find the motion trajectories, a motion estimation procedure is adopted as a part of this process. The motion estimation procedure looks for similar image objects between two frames. A frequently adopted motion estimation procedure is called block matching or block-based motion estimation. A block in the current (target) frame is to be matched with candidates in the previous (reference) frames.

There are currently several types of algorithms used for block matching. The very basic block matching algorithm is the exhaustive search algorithm. The exhaustive search algorithm compares every possible block candidate within a search window against the current block. To reduce computations, many "fast" search algorithms have been proposed. One popular class of algorithms is called hierarchical search, wherein at each hierarchy, matching is performed on a sparse grid of the candidate blocks. Then the best candidate vector is used as the starting point for the next hierarchy using a denser grid.

All the algorithms discussed above produce a set of motion vectors, and then differential coding technique is applied to the motion vectors of adjacent blocks. Next, a variable-length encoding technique is used to encode these differential values of motion vectors. In the aforementioned motion estimation process, for rapid moving blocks or blocks moving out of the reference frame, a good match may not be found. Thus, there may be errors in the result of motion estimation, that is, incorrect motion vectors. As a consequence of this, poor quality low-pass and high-pass frames are produced in inter-frame wavelet coding.

FIG. 3($a$) shows the first frame of a continuous video sequence before moving. When the object (or camera) in FIG. 3($a$) moves swiftly to output the next frame, the typical motion estimation results (motion vectors) are shown in FIG. 3($b$). From FIG. 3($b$), it can be seen that the motion vectors (short-line strokes) are inconsistent in certain areas and they are certainly not representing the correct motion. The reason that these motion vectors are incorrect is due to the fact that the motion estimation process cannot accurately estimate the motion vector of each block due to object deformation, occlusion, lighting changes, camera noise etc. Thereby, the resulting frame with motion compensation as in the low-pass frame in wavelet coding is distorted, and furthermore, the number of bits needed to transmit the motion information is higher.

Therefore, there is a need for a motion information processing method that would improve the accuracy of motion vectors and at the same time reduce the number of bits used.

SUMMARY OF THE INVENTION

In order to meet the above requirements, a primary objective of the present invention is to provide a method for processing motion information comprising: after performing a motion estimation process on the target frame, adjusting motion vectors by motion vector filtering, thereby reducing the number of motion information bits and increasing the quality of the temporally wavelet-filtered image outputs.

Another objective of the present invention is to provide a method for processing motion information, wherein similar motion vectors estimated by the motion estimation are selected and merged, thereby increasing the conformity of the moving vectors contained.

In order to achieve the above objectives, the present invention provides a method for processing motion information, comprising: performing motion estimation process on the target frame of a video sequence to obtain motion vectors for each block contained in the target frame; adjusting the motion vectors by a motion vector filtering process; and selecting and merging similar motion vectors.

BRIEF DESCRIPTION OF THE DRAWINGS

A better understanding of the present invention can be obtained when the forgoing detailed description is considered in conjunction with the following drawings, in which:

FIG. 2($b$) shows the motion vectors of the blocks shown in FIG. 2($a$);

FIG. 2($c$) shows the processed motion vector of FIG. 2($b$);

FIG. 3($b$) shows the motion vectors in FIG. 3($a$) using a conventional motion estimation technique.

DETAILED DESCRIPTION OF THE PREFERRED EMBODIMENT

The descriptions below of specific embodiments are to illustrate the present invention. Others skilled in the art can easily understand other advantages and features of the present invention from contents disclosed in this specification. The present invention can be carried out or applied through different embodiments. Every details of this specification can be modified based on different viewpoints and applications yet still within the scope of the present invention.

Figure 1:
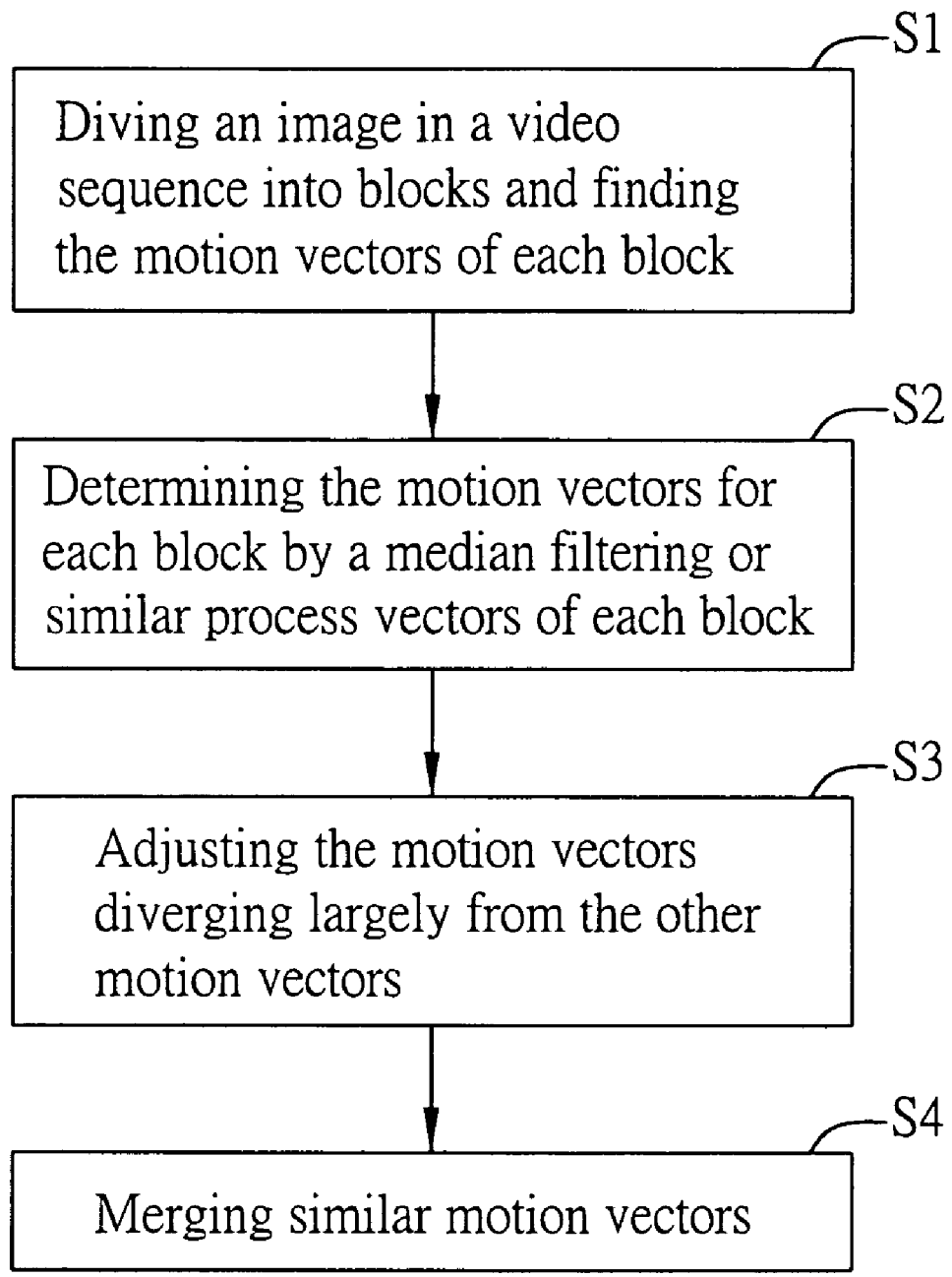
FIG. 1 is a flow diagram showing the steps of performing motion information processing according to the present invention.
Figure 2A:
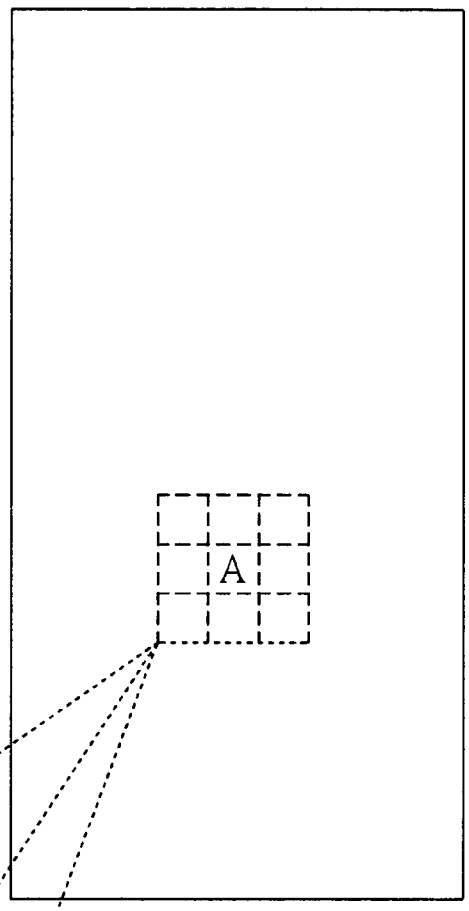
FIG. 2($a$) shows a block and its neighboring blocks contained in an image.
Figure 2B:
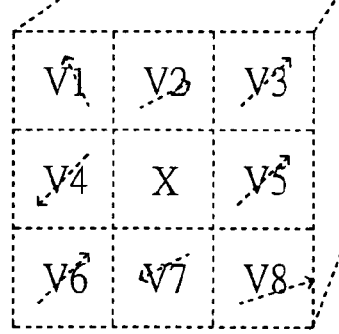

The embodiments below are only to illustrate aspects of the present invention; it should not be construed as to limit the scope of the present invention in any way. FIG. 1 is a flow diagram showing the steps of performing video image process according to the present invention. FIG. 2(a) shows the location of block A and its 8 neighboring blocks. The motion vectors of these 9 neighboring blocks in FIG. 2(b) are generated by a certain motion estimation method. An embodiment of the method of the present invention will be described in detail with reference to FIGS. 1, 2(a) to 2(c).

In step S1, the target image to be processed is divided into blocks as shown in FIG. 2(a). The smallest block size can be 1 line by 1 sample depending on the motion estimation method used, which is outside the scope of this invention. The image dividing technique and motion estimation method are well-known techniques in the art, and the description of which will thus be omitted herein. In this embodiment, block A is selected to illustrate the application of the present invention. However, it should be noted that the application of the present invention is not limited to this block A, but to any block in FIG. 2(a), and to any block size that deemed appropriate. FIG. 2(b) shows an intermediate motion vector field before outputting the final set of motion vectors and after motion estimation is performed to the target frame. The motion vector of block A is inconsistent with the motion vectors of its neighboring blocks. To improve this situation, proceeding to step S2.

Step S2 is described with reference to FIG. 2(b), where the motion vectors of block A and its neighbors are shown. Each block in illustration contains an arrow indicating the motion vector, which is estimated by a certain motion estimation method. However, the estimated motion vectors may be inconsistent, therefore in step S2, a motion vector processing procedure is performed to obtain a motion vector for block A. An example of such a processing procedure is the median filter.

Figure 2C:
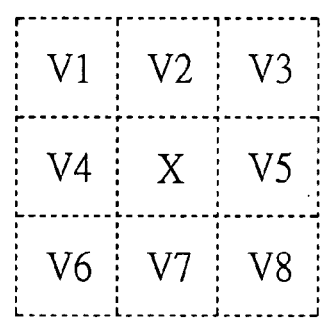

The process of median filtering performed on each block is illustrated using, for example, block A with motion vector X. The median filter uses the motion vectors on neighboring blocks surrounding the target block to be filtered to determine the motion vector for the target block. In FIG. 2(b), the median filter arranges the motion vectors of the eight blocks (V1-V8) surrounding block A and the motion vector X of block A in an ordered sequence, according to their differences with the motion vector X in block A from small to big. Then, the motion vector at the median of this sequence is selected as the new motion vector for block A, as shown in FIG. 2(c). This process is repeated for all the other blocks in this image frame. This median filtering process allows the motion vectors that are at odds (not pointing to substantially the same direction with the most of the motion vectors in its neighborhood) to be filtered out, since they will be located at the extreme ends of the sequence of motion vectors as mentioned above, thereby reducing motion vector irregularity. Noted that 8-block neighborhood used in the above example is only an illustration. Depending on the design and implementation situations, a smaller or larger number of neighboring blocks may be used. Also, the processing of the neighboring motion vectors can be selected from the median value, the weighted average value, the majority value or the other arithmetic operations on the motion vectors in its neighborhood. Then, proceeds to step S3.

In step S3, after the median filtering process, the motion vectors that are still diverge from the other motion vectors will be detected and altered. Then, proceeds to step S4.

In step S4, similar motion vectors in a neighborhood may be set into identical to enhance conformity among motion vectors and to reduce motion information.

In summary, the method of processing motion information according to the present invention is applicable to video compression schemes for continuous images, which performs a motion vector filtering process, so that the image distortion due to motion compensation or motion-compensated temporal filtering is reduced. The motion vectors are further merged to reduce the number of bits for representing motion information contained in a frame, such that the efficiency of the subsequent compression process can be increased.

Figure 3A:
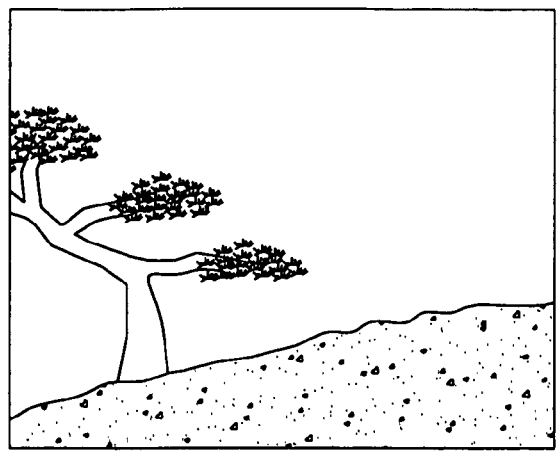
FIG. 3($a$) shows a frame of a video sequence containing grasslands with a flower bed and a tree on the top of it.
FIG. 3(c) shows the motion vectors in FIG. 3(a) using the method according to the present invention.
Figure 3B:
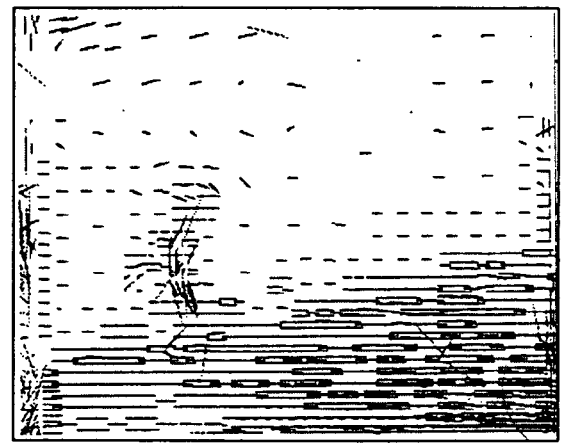
Figure 3C:
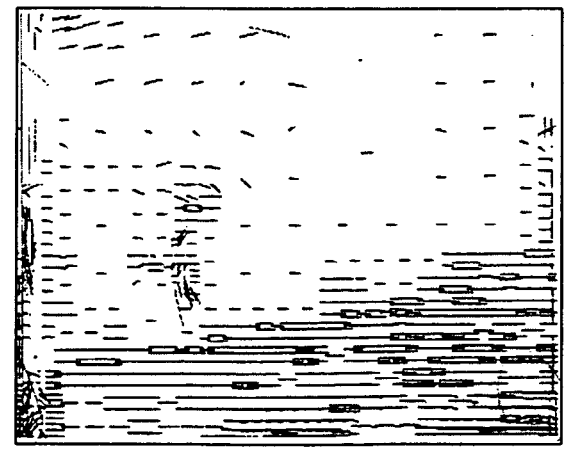

FIG. 3(a) shows a video sequence containing grasslands with a flower bed and a tree on the top of it. When using the conventional motion estimation method, the motion vectors are often disordered as shown in FIG. 3(b), since the conventional method performs only the motion estimation process, wherein the motion vectors may be disoriented due to poor matching. In addition, no further adjustment is done to merge similar motion vectors. FIG. 3(c) shows the motion vectors after performing the motion estimation and motion filtering processes, according to the method of the present invention. The motion vectors are adjusted and merged, so that they are more in conformity compared to that in FIG. 3(b). In addition, fewer bits are used to represent the motion information, thereby increasing the efficiency for subsequent compression process.

While the invention has been described in detail with reference to specific embodiments thereof, it will be apparent in the art that various changes and modifications can be made, and equivalents employed, without departing from the scope of the claims.

What is claimed is:

1. A method for processing motion information for enhancing quality of an image output in an electronic format, the method comprising:

(1) performing motion estimation process on the target frame of a video sequence to obtain motion vectors for each block contained in the target frame during the process of outputting a intermediate motion vector field of the target frame by an electronic device;

(2) adjusting the motion vectors for each block in the intermediate motion vector field by a motion vector filtering process by the electronic device; and (3) selecting and merging similar motion vectors in the intermediate motion vector field by the electronic device, wherein the motion vector filtering process is a median filtering process that determines the motion vector of a target block based on the median of motion vectors in blocks surrounding the target block, and comprises:

selecting a motion vector from a target block to be filtered and the motion vectors from the surrounding blocks;

arranging the motion vectors of the surrounding blocks into an ordered sequence according to the respective difference with the motion vector of the target block; and assigning the median motion vector in said ordered sequence as the new motion vector for the target block.

2. The method as claimed in claim 1, wherein the method can be applied to many video compression processes for continuous image.

3. The method as claimed in claim 1, wherein the motion vector filtering process determines the motion vector for the target block to be processed, which is the same with the motion vectors contained in the majority of the blocks surrounding the target block.

4. The method as claimed in claim 1, wherein the step of merging similar motion vectors enhances the efficiency of subsequent compression process.

* * * * *